(12) United States Patent
Wang et al.

(10) Patent No.: US 12,110,449 B1
(45) Date of Patent: Oct. 8, 2024

(54) BIO-ENZYME DEGRADABLE TEMPORARY PLUGGING MATERIAL AND PREPARATION METHOD AND APPLICATION THEREOF

(71) Applicant: CHINA UNIVERSITY OF PETROLEUM (EAST CHINA), Qingdao (CN)

(72) Inventors: Jintang Wang, Qingdao (CN); Bo Liao, Qingdao (CN); Xiaohui Sun, Qingdao (CN); Jiaqi Xu, Qingdao (CN); Yingrui Bai, Qingdao (CN); Jian Li, Qingdao (CN); Xianbin Huang, Qingdao (CN); Jiafeng Jin, Qingdao (CN); Meichun Li, Qingdao (CN); Shenglong Shi, Qingdao (CN); Kaihe Lv, Qingdao (CN); Jingping Liu, Qingdao (CN); Jinsheng Sun, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 18/391,726

(22) Filed: Dec. 21, 2023

(30) Foreign Application Priority Data

Sep. 12, 2023 (CN) .......................... 202311168559.0

(51) Int. Cl.
*C09K 8/42* (2006.01)
(52) U.S. Cl.
CPC .................... *C09K 8/426* (2013.01)

(58) Field of Classification Search
CPC ....................................................... C09K 8/426
See application file for complete search history.

(56) References Cited

U.S. PATENT DOCUMENTS

| | | | |
|---|---|---|---|
| 4,042,031 A * | 8/1977 | Knapp | C09K 8/502 |
| | | | 166/276 |
| 4,422,947 A | 12/1983 | Dorsey et al. | |
| 6,079,492 A | 6/2000 | Hoogteijling et al. | |
| 11,661,815 B1 | 5/2023 | Quero et al. | |
| 2015/0267103 A1* | 9/2015 | Medvedev | E21B 33/13 |
| | | | 507/221 |
| 2016/0333260 A1* | 11/2016 | Drake | E21B 43/267 |
| 2019/0225866 A1* | 7/2019 | Blue | E21B 21/003 |
| 2019/0330520 A1* | 10/2019 | Cannan | C23C 14/06 |
| 2022/0010199 A1* | 1/2022 | Ruan | C09K 8/805 |

* cited by examiner

*Primary Examiner* — Alicia Bland
(74) *Attorney, Agent, or Firm* — CBM PATENT CONSULTING, LLC

(57) ABSTRACT

Disclosed is a bio-enzyme degradable temporary plugging material and a preparation method and application thereof in the technical field of natural gas hydrate drilling and production; the preparation method of the bio-enzyme degradable temporary plugging material includes the following steps: mixing the ceramsite with an aqueous solution of 3-aminopropyl trimethoxysilane before a stirring reaction and drying to obtain modified ceramsite; and fully dispersing the modified ceramsite, ethyl cellulose, and epoxy resin in dichloromethane to obtain an oil phase; adding the oil phase into a gelatin aqueous solution and mixing uniformly; after a stirring reaction, evaporating an organic solvent, filtering, washing, and drying, to obtain the bio-enzyme degradable temporary plugging material.

5 Claims, 5 Drawing Sheets

BIO-ENZYME DEGRADABLE TEMPORARY PLUGGING MATERIAL AND PREPARATION METHOD AND APPLICATION THEREOF

CROSS-REFERENCE TO RELATED APPLICATIONS

This application claims priority to Chinese Patent Application Ser. No. CN202311168559.0 filed on 12 Sep. 2023.

FIELD OF THE INVENTION

The present disclosure relates to the technical field of natural gas hydrate drilling and production, and in particular to a bio-enzyme degradable temporary plugging material, which includes a preparation method and the application.

BACKGROUND OF THE INVENTION

As a new type of high-quality energy, natural gas hydrate has the advantages of high unit heating value, small exhaust pollution, environmental protection, being non-toxic, easy diffusion, and the like. Rational development and utilization of hydrate will help to solve the energy security, alleviate climate change, and accelerate the sustainable development of energy. Submarine gas hydrate is very sensitive to temperature, pressure, and extraneous fluids, and the exploitation of natural gas hydrate can be realized by changing the phase equilibrium condition of the hydrate reservoir. By enlarging the area of mass and heat transfer between the wellbore and reservoir in a complex structuralwell such as a horizontal well, the decomposition rate of hydrate and the recovery efficiency of natural gas can be effectively improved, and the production of hydrate can be improved.

Hydrate formation is weakly consolidated and non-diagenetic, and during the drilling process of natural gas hydrate, the stability of the reservoir is easily affected. At the same time, drilling fluid intrudes into the reservoir, exchanges heat with the hydrate reservoir, changes the equilibrium condition of the reservoir, and causes the well wall instability of the hydrate reservoir, resulting in reservoir damage. To solve such problems, plugging agents are usually used to plug the reservoir, but the plugging agents are difficult to remove, affecting the subsequent drilling work. Although the prior art has reported selectively removable plugging materials, on the one hand, the plugging ability is poor, and on the other hand, the removal method is often the addition of release agents, which contaminate the formation. For example, Chinese patent document CN113105878A discloses a selectively removable plugging material with both reservoir protection and permeability enhancement functions, which is composed of a high-strength support material and a filling material; the high-strength support material is used as a bridging material, and the removable material is used as the filling material. The high-strength support material has high compression resistance and a large friction coefficient, so it is easy to bridge in the crack and form a plugging layer. The removable material can be selectively dissolved and removed under the conditions of reservoir temperature, pressure, and removal liquid. However, the selectively removable plugging material prepared by the present disclosure is simply adding the removable material and the high-strength support material into the drilling fluid to be carried into the reservoir to plug the crack, failing to consider the overall structure of the material, and the plugging being uncontrollable; the present disclosure uses a 15% hydrochloric acid solution for acidizing and plugging removal, but acidizing and plugging removal on the one hand would pollute the formation, and on the other hand would damage to reservoir acid sensitivity, dissolve formation minerals, generate various chemical precipitates, block pore throats of oil and gas layers, and reduce oil and gas layer permeability.

SUMMARY OF THE INVENTION

An object of the present disclosure is to develop a new temporary plugging material for plugging a reservoir during drilling and easy plugging removal after drilling, aiming at solving the problems of well wall instability and reservoir damage faced by a complex structural well such as a horizontal well in existing hydrate exploitation. The present disclosure provides a bio-enzyme degradable temporary plugging material and a preparation method and application thereof. The temporary plugging material can not only be injected into a formation to form a plugging layer, protect a hydrate reservoir, and improve the stability of well walls during drilling, but also after a bio-enzyme degrades the temporary plugging material, the plugging layer is removed, the permeability of the formation is recovered, and the recovery efficiency of the hydrate reservoir is improved.

The Technical Solution of the Present Disclosure is as Follows

A bio-enzyme degradable temporary plugging material is a modified ceramsite surface coated with ethyl cellulose, epoxy resin, and gelatin materials.

Preferably, according to the present disclosure, the modified ceramsite is the ceramsite modified by the surface of 3-aminopropyl trimethoxysilane.

A preparation method of the bio-enzyme degradable temporary plugging material includes the following steps:
(1) Preparation of Modified Ceramsite
  mixing the ceramsite with an aqueous solution of 3-aminopropyl trimethoxysilane before a stirring reaction and drying to obtain modified ceramsite; and
(2) Preparation of the Temporary Plugging Material
  fully dispersing the modified ceramsite, ethyl cellulose, and epoxy resin in dichloromethane to obtain an oil phase; adding the oil phase into a gelatin aqueous solution and mixing uniformly; after a stirring reaction, evaporating an organic solvent, filtering, washing, and drying, to obtain the bio-enzyme degradable temporary plugging material.

Preferably, according to the present disclosure, in step (1), a particle size of the ceramsite is 20 to 40 μm.

Preferably, according to the present disclosure, in step (1), a mass ratio of the ceramsite to 3-aminopropyl trimethoxysilane is 4 to 20:1.

Preferably, according to the present disclosure, in step (1), a mass concentration of the aqueous solution of 3-aminopropyl trimethoxysilane is 0.5% to 10%.

Preferably, according to the present disclosure, in step (1), a stirring reaction temperature is room temperature, a stirring reaction time is 30 to 50 minutes, and a stirring rate is 200 to 300 r/min.

Preferably, according to the present disclosure, in step (2), a mass ratio of the modified ceramsite, ethyl cellulose, and epoxy resin is 1 to 4:1:1.

Preferably, according to the present disclosure, in step (2), a mass ratio of the modified ceramsite and dichloromethane is 1:4 to 6.

Preferably, according to the present disclosure, in step (2), a mass concentration of the gelatin aqueous solution is 0.5% to 10%.

Preferably, according to the present disclosure, in step (2), a mass ratio of dichloromethane in the oil phase to water in the gelatin aqueous solution is 1:1.

Preferably, according to the present disclosure, in step (2), a stirring reaction temperature is room temperature, a stirring reaction time is 4 to 6 hours, and a stirring rate is 200 to 300 r/min.

Preferably, according to the present disclosure, in step (2), the organic solvent is evaporated at an evaporation temperature of 45 to 55° C. for an evaporation time of 1 to 3 hours under stirring conditions.

The application of the bio-enzyme degradable temporary plugging material in the drilling process of natural gas hydrate exploitation in sea areas is provided.

Preferably, according to the present disclosure, during drilling, the bio-enzyme degradable temporary plugging material is used to plug reservoirs to maintain the stability of well walls; after drilling, a bio-enzyme is used to degrade the temporary plugging material to achieve plugging removal.

Preferably, the bio-enzyme is a low-temperature complex enzyme, cellulase, or amylase, and further preferably the low-temperature complex enzyme.

Preferably, after drilling, a bio-enzyme aqueous solution with a mass concentration of 0.1 to 10% is injected into the formation to achieve degradation of the temporary plugging material.

According to the present disclosure, the amount and injection method of the bio-enzyme degradable temporary plugging material during drilling are as in the prior art.

The Technical Features and Beneficial Effects of the Present Disclosure are as Follows 1. The present disclosure provides a bio-enzyme degradable temporary plugging material with the features of plugging the reservoir during drilling and easy plugging removal after drilling, aiming at the problems of well wall instability and reservoir damage faced by a complex structural well such as a horizontal well in the exploitation of natural gas hydrate in sea areas. The temporary plugging material of the present disclosure can form a plugging layer in the formation, plugging the passage between the wellbore and the hydrate, and enhancing the stability of the well wall during drilling; after drilling, the temporary plugging material is degraded by bio-enzymes and has the plugging removal performance, the formation channels are opened, and the formation permeability is restored.
2. The bio-enzyme degradable temporary plugging material of the present disclosure takes the modified ceramsite as the core, and forms a hydrogen bond between the Si—OH in the silane coupling agent and the —OH in the ceramsite, so that the silane coupling agent is adsorbed on the surface of the ceramsite to form the modified ceramsite. The modification of the silane coupling agent of the present disclosure can effectively reduce water entering the pores of the ceramsite, and can also increase the adhesion capacity of the ceramsite as a bridge connecting the ceramsite with wall material. The Si—OH in the coupling agent of the present disclosure simultaneously forms a hydrogen bond with the —OH in the ethyl cellulose to connect the ceramsite and the ethyl cellulose; if the ceramsite is not modified, the ceramsite and ethyl cellulose cannot be stably connected, and the wrapping effect of ethyl cellulose is not ideal, which affects the plugging performance of temporary plugging materials. The wall material further encapsulates the ceramsite, plugs the pores of the ceramsite, enhances the plugging performance of the temporary plugging material, blocks the invasion of external fluid into the hydrate reservoir, protects the equilibrium conditions of the reservoir, and prevents reservoir damage. The wall material ethyl cellulose of the present disclosure is suitable as a wall material for use in the plugging removal of temporary plugging materials because it has a slow-release skeleton structure, and will slowly release the ceramsite after wrapping the core material ceramsite; the wall material epoxy resin and ethyl cellulose of the present disclosure are crosslinked and polymerized to form a network structure, which can enhance the plugging performance of the temporary plugging material; the type of the wall material of the present disclosure is specific, for example, replacing the type of the wall material will reduce the plugging and degradable properties of the temporary plugging material of the present disclosure. The present disclosure is based on a solvent evaporation method, using an oil phase as a dispersed phase and a gelatin aqueous solution as a dispersion medium, to remove a volatile organic solvent of the dispersed phase from an emulsion to prepare a temporary plugging material; gelatin acts as an emulsifier, reducing the interfacial tension of the components in the mixed system, forming a film on the surface of the dispersed phase microspheres, and preventing the microspheres from coalescing.
3. The present disclosure uses the degradation ability of the bio-enzyme to degrade the wall material of the temporary plugging material; as the degradation time increases, the degradation ability of the bio-enzyme increases, and the wall material of the temporary plugging material is gradually destroyed; under the combined action of the external fluid and the bio-enzyme, the pore channel of the ceramsite is opened, and the permeability is restored, to realize the exploitation of the hydrate reservoir. The specific type of bio-enzymes of the present disclosure facilitate the degradation of the temporary plugging material of the present disclosure to realize plugging removal.
4. The present disclosure modifies the surface of the ceramsite by a coupling agent modification method, plugs the pore channel of the ceramsite, and connects the ceramsite and the wall material; the modified ceramsite, ethyl cellulose, and epoxy resin are dissolved in an organic solvent, mixed with the gelatin aqueous solution and dispersed to form an emulsion, then the organic solvent is removed by a solvent evaporation method to prepare the temporary plugging material with a good coating effect. In the preparation method of the present disclosure, the mass ratio of the modified ceramsite, ethyl cellulose, and epoxy resin needs to be suitable, and if not suitable, the coating effect is not good, thereby reducing the plugging performance of the temporary plugging material. Steps and conditions in the preparation method of the present disclosure work together to achieve the excellent effects of the present disclosure.
5. The raw materials used in the preparation of the bio-enzyme degradable temporary plugging material of the present disclosure are easy to obtain; the preparation cost is low, the preparation method is simple, and

DETAILED DESCRIPTION OF THE EMBODIMENTS

Figure 1:
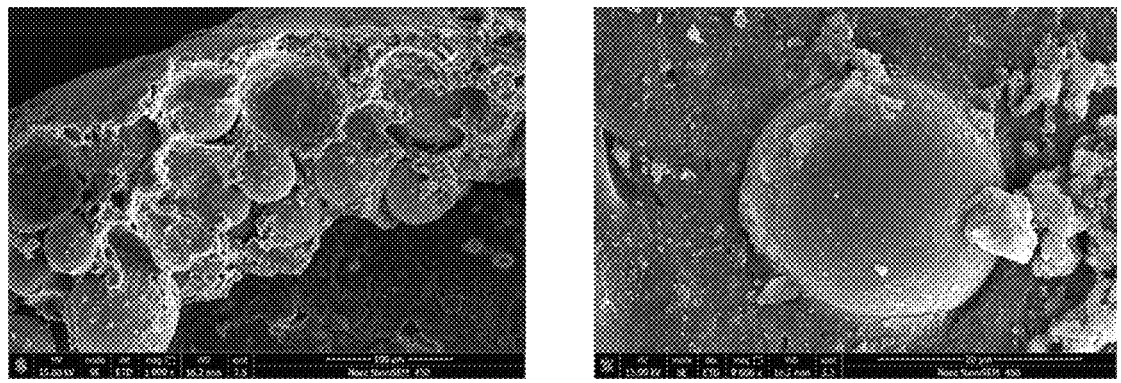
FIG. 1 is a scanning electron microscope (SEM) graph of a bio-enzyme degradable temporary plugging material prepared in Example 1.

The present disclosure will be further described below in combination with examples.

Meanwhile, the experimental methods described in the following examples are conventional unless otherwise specified; such reagents, materials, and equipment, unless otherwise specified, are commercially available.

Example 1

A preparation method of a bio-enzyme degradable temporary plugging material includes the following steps:
(1) Preparation of Modified Ceramsite 1 mL of 3-aminopropyl trimethoxysilane was mixed with 100 mL of deionized water to obtain a silane coupling agent solution. 20 g of ceramsite (the particle size of the ceramsite is 20 to 40 μm) was fully dispersed in the silane coupling agent solution and reacted with stirring for 40 minutes at a stirring rate of 200 r/min at room temperature, and then dried to obtain modified ceramsite.

(2) Preparation of the Temporary Plugging Material 1 g of gelatin was dissolved in 100 mL of deionized water, and heated and stirred to form a gelatin aqueous solution as an aqueous phase; the stirring temperature was 30° C., and the stirring rate was 200 r/min. 20 g of modified ceramsite, 5 g of ethyl cellulose, and 5 g of epoxy resin were dispersed in 100 g of dichloromethane, and uniformly stirred to form a mixed solution as an oil phase; the stirring rate was 200 r/min, and the stirring temperature was room temperature. An oil phase was added into an aqueous phase, mixed uniformly, and continuously stirred at room temperature for 5 hours at a stirring rate of 200 r/min, increasing the temperature to 50° C. and stirring for 2 hours to evaporate the organic solvent, during which the microspheres gradually solidified; the microspheres were removed by filtration before washing with deionized water for 2 to 3 times and drying at 70 to 80° C. for 12 hours to obtain the bio-enzyme degradable temporary plugging material.

Example 2

A preparation method of a bio-enzyme degradable temporary plugging material includes the following steps:
(1) Preparation of Modified Ceramsite 1 mL of 3-aminopropyl trimethoxysilane was mixed with 100 mL of deionized water to obtain a silane coupling agent solution. 20 g of ceramsite (the particle size of the ceramsite is 20 to 40 μm) was fully dispersed in the silane coupling agent solution and reacted with stirring for 40 minutes at a stirring rate of 200 r/min at room temperature, and then dried to obtain modified ceramsite.

(2) Preparation of the Temporary Plugging Material 1 g of gelatin was dissolved in 100 mL of deionized water, and heated and stirred to form a gelatin aqueous solution as an aqueous phase; the stirring temperature was 30° C., and the stirring rate was 200 r/min. 20 g of modified ceramsite, 10 g of ethyl cellulose, and 10 g of epoxy resin were dispersed in 100 g of dichloromethane, and uniformly stirred to form a mixed solution as an oil phase; the stirring rate was 200 r/min, and the stirring temperature was room temperature. An oil phase was added into an aqueous phase, mixed uniformly, continuously stirred at room temperature for 5 hours at a stirring rate of 200 r/min, increasing the temperature to 50° C. and stirring for 2 hours to evaporate the organic solvent, during which the microspheres gradually solidified; the microspheres were removed by filtration before washing with deionized water for 2 to 3 times and drying at 70 to 80° C. for 12 hours to obtain the bio-enzyme degradable temporary plugging material.

Example 3

A preparation method of a bio-enzyme degradable temporary plugging material includes the following steps:
(1) Preparation of Modified Ceramsite 1 mL of 3-aminopropyl trimethoxysilane was mixed with 100 mL of deionized water to obtain a silane coupling agent solution. 20 g of ceramsite (the particle size of the ceramsite is 20 to 40 μm) was fully dispersed in the silane coupling agent solution and reacted with stirring for 40 minutes at a stirring rate of 200 r/min at room temperature, and then dried to obtain modified ceramsite.

(2) Preparation of the Temporary Plugging Material 1 g of gelatin was dissolved in 100 mL of deionized water, and heated and stirred to form a gelatin aqueous solution as an aqueous phase; the stirring temperature was 30° C., and the stirring rate was 200 r/min. 20 g of modified ceramsite, 20 g of ethyl cellulose, and 20 g of epoxy resin were dispersed in 100 g of dichloromethane, and uniformly stirred to form a mixed solution as an oil phase; the stirring rate was 200 r/min, and the stirring temperature was room temperature. An oil phase was added into an aqueous phase, mixed uniformly, continuously stirred at room temperature for 5 hours at a stirring rate of 200 r/min, increasing the temperature to 50° C. and stirring for 2 hours to evaporate the organic solvent, during which the microspheres gradually solidified; the microspheres were removed by filtration before washing with deionized water for 2 to 3 times and drying at 70 to 80° C. for 12 hours to obtain the bio-enzyme degradable temporary plugging material.

Comparative Example 1

A preparation method of a temporary plugging material includes the following steps:

Preparation of Modified Ceramsite 1 mL of 3-aminopropyl trimethoxysilane was mixed with 100 mL of deionized water to obtain a silane coupling agent solution. 20 g of ceramsite (the particle size of the ceramsite is 20 to 40 µm) was fully dispersed in the silane coupling agent solution and reacted with stirring for 40 minutes at a stirring rate of 200 r/min at room temperature, and then dried to obtain modified ceramsite.

Comparative Example 2

A preparation method of a temporary plugging material includes the following steps:
(1) Preparation of Modified Ceramsite 1 mL of 3-aminopropyl trimethoxysilane was mixed with 100 mL of deionized water to obtain a silane coupling agent solution. 20 g of ceramsite (the particle size of the ceramsite is 20 to 40 µm) was fully dispersed in the silane coupling agent solution and reacted with stirring for 40 minutes at a stirring rate of 200 r/min at room temperature, and then dried to obtain modified ceramsite.
(2) Preparation of the Temporary Plugging Material 1 g of gelatin was dissolved in 100 mL of deionized water, and heated and stirred to form a gelatin aqueous solution as an aqueous phase; the stirring temperature was 30° C., and the stirring rate was 200 r/min. 20 g of modified ceramsite and 5 g of ethyl cellulose were dispersed in 100 g of dichloromethane, and uniformly stirred to form a mixed solution as an oil phase; the stirring rate was 200 r/min, and the stirring temperature was room temperature. An oil phase was added into an aqueous phase, mixed uniformly, and continuously stirred at room temperature for 5 hours at a stirring rate of 200 r/min, increasing the temperature to 50° C. and stirring for 2 hours to evaporate the organic solvent, during which the microspheres gradually solidified; the microspheres were removed by filtration before washing with deionized water for 2 to 3 times and drying at 70 to 80° C. for 12 hours to obtain the temporary plugging material.

Comparative Example 3

A preparation method of a temporary plugging material includes the following steps:
(1) Preparation of Modified Ceramsite 1 mL of 3-aminopropyl trimethoxysilane was mixed with 100 mL of deionized water to obtain a silane coupling agent solution. 20 g of ceramsite (the particle size of the ceramsite is 20 to 40 µm) was fully dispersed in the silane coupling agent solution and reacted with stirring for 40 minutes at a stirring rate of 200 r/min at room temperature, and then dried to obtain modified ceramsite.
(2) Preparation of the Temporary Plugging Material 1 g of gelatin was dissolved in 100 mL of deionized water, and heated and stirred to form a gelatin aqueous solution as an aqueous phase; the stirring temperature was 30° C., and the stirring rate was 200 r/min. 20 g of modified ceramsite and 5 g of epoxy resin were dispersed in 100 g of dichloromethane, and uniformly stirred to form a mixed solution as an oil phase; the stirring rate was 200 r/min, and the stirring temperature was room temperature. An oil phase was added into an aqueous phase, mixed uniformly, and continuously stirred at room temperature for 5 hours at a stirring rate of 200 r/min, increasing the temperature to 50° C. and stirring for 2 hours to evaporate the organic solvent, during which the microspheres gradually solidified; the microspheres were removed by filtration before washing with deionized water for 2 to 3 times and drying at 70 to 80° C. for 12 hours to obtain the bio-enzyme degradable temporary plugging material.

Test Example 1

The bio-enzyme degradable temporary plugging material prepared in Example 1, the modified ceramsite in Comparative example 1, and the temporary plugging materials in Comparative examples 2 and 3 were evaluated for their properties by the following test methods.

1. SEM Analysis

The SEM is used to test the bio-enzyme degradable temporary plugging material prepared in Example 1. The results are shown in FIG. 1. Microscopically, the pores of the ceramsite are wrapped with a coating layer on the surface of the ceramsite. The wall material plugs the pores of the ceramsite, which verifies that the temporary plugging material has plugging properties. The bio-enzyme degradable temporary plugging material is formed. Since the wall material contains cellulose derivatives, it can be degraded by the bio-enzyme, thereby opening the channel for plugging removal. In FIG. 1, the left scale bar is 100 µm, and the right scale bar is 20 µm.

2. Plugging Test

The initial permeability of the core is tested, the bio-enzyme degradable temporary plugging material prepared in Example 1, the modified ceramsite in Comparative example 1, and the temporary plugging materials in Comparative examples 2 and 3 are tested for the permeability after plugging the core, and the plugging rate is calculated according to the plugging rate formula of the core, and the plugging effect of the temporary plugging material is evaluated.

$$k = \frac{Q\mu L}{A\Delta P} \times 10^2,$$

where k is the core permeability, md; Q is the volume of fluid passing through the rock sample in unit time, cm$^3$/s; µ is fluid viscosity, mPa·s; L is the core length, cm; $\Delta P$ is the pressure difference between the front and rear ends of the core, MPa; and A is the cross-sectional area of the core, cm$^2$.

$$E = \frac{K_0 - K_w}{K_0},$$

where E is the plugging rate, %; $K_0$ is the core permeability before plugging, md; and $K_w$ is the core permeability after plugging, md.

The specific test methods are as follows:

A core (5 cm in length and 2.5 cm in diameter) is loaded into the holder, the confining pressure is set to 5 MPa, the back pressure is set to 2 MPa, the fluid flow rate is adjusted to 1 mL/min, the fluid is displaced to the core, and the initial permeability of the core is recorded, stopping the displacement, unloading the confining pressure, and disassembling the holder. The core is loaded into the holder, 6 g of temporary plugging materials are plugged at the front end of the core, the confining pressure is set to 5 MPa, the back pressure is set to 2 MPa, the fluid flow rate is adjusted to 1 mL/min, the fluid is displaced to the core, the permeability of the core after plugging is recorded, and the plugging rate is calculated.

Figure 2:
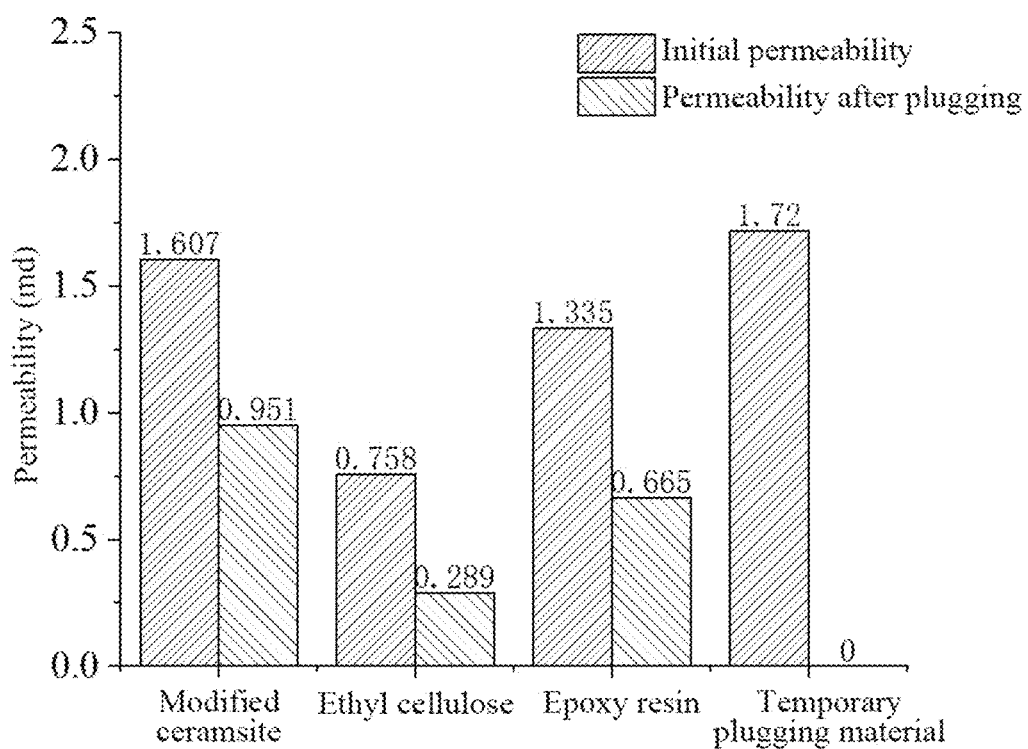
FIG. 2 is a permeability change graph of temporary plugging materials obtained in Example 1, Comparative example 1, Comparative example 2, and Comparative example 3.
Figure 3:
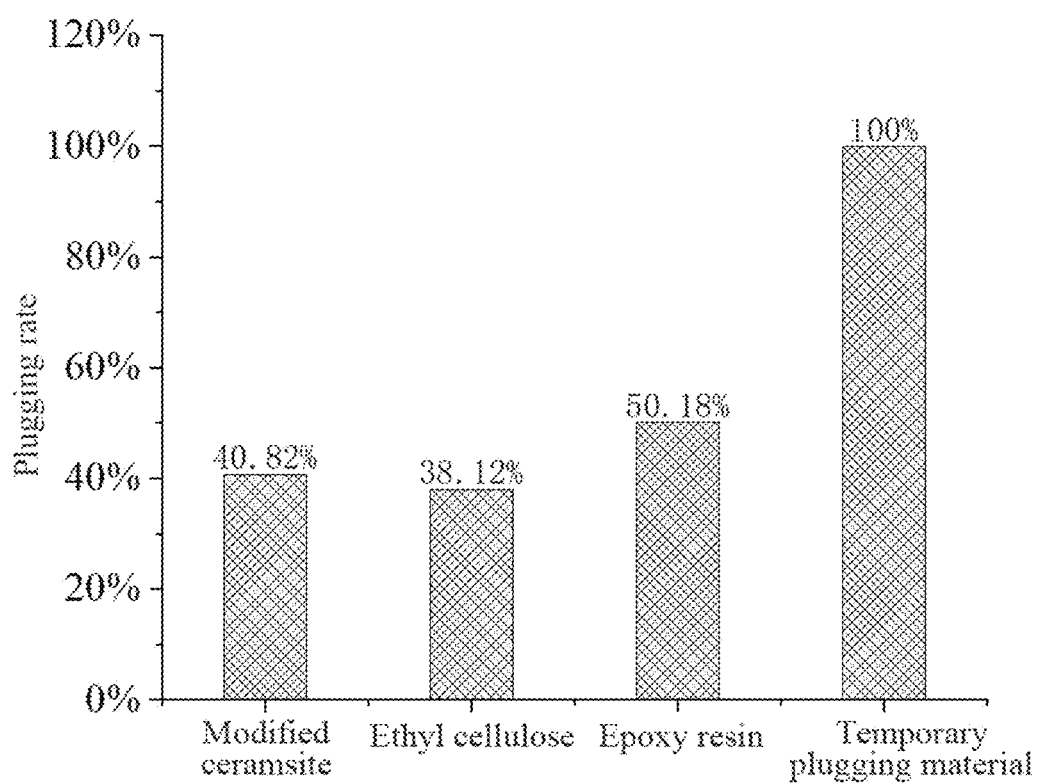
FIG. 3 is a plugging ratio graph of temporary plugging materials obtained in Example 1, Comparative example 1, Comparative example 2, and Comparative example 3.

As shown in FIGS. 2 and 3, comparing the temporary plugging materials coated with modified ceramsite (Comparative example 1), ethyl cellulose (Comparative example 2), or epoxy resin (Comparative example 3), the permeability changes greatly before and after plugging the core, the plugging rates are 40.82%, 38.12%, and 50.18%, the obtained plugging rate is small, the core cannot be completely plugged, and the plugging performance of the material is poor. However, in Example 1, the plugging rate of the temporary plugging material encapsulated by the mixture of ethyl cellulose and epoxy resin is 100%, the permeability after plugging decreases to 0, and the core is completely plugged, and the temporary plugging material which is modified by ceramsite and encapsulated by ethyl cellulose and epoxy resin has a strong plugging performance and effectively enhances the plugging effect. Therefore, under the encapsulation of the single-wall material, the temporary plugging material has a certain plugging capacity, the plugging rate is maintained at 40% to 50%, while under the encapsulation of the multi-wall material, the temporary plugging material structure can effectively prevent water invasion, the plugging rate can reach 100%, the plugging effect is strong, effective for reservoir plugging.

3. Plugging Removal Test

The bio-enzyme degradable temporary plugging material prepared in Example 1 is tested for its plugging removal performance. The low-temperature complex enzyme, cellulase, or amylase is put at 15° C. to degrade the temporary plugging material for 24 hours, and the permeability recovery rate of the temporary plugging material for plugging the core after degradation is tested.

Test Method:

A 0.2 wt % bio-enzyme aqueous solution is prepared, the temporary plugging material is added into the bio-enzyme aqueous solution and degraded at 15° C. for 24 hours before taking out the degraded temporary plugging material.

A core is loaded into the holder, the confining pressure is set to 5 MPa, the back pressure is set to 2 MPa, the fluid flow rate is adjusted to 1 mL/min, the fluid is displaced to the core, and the initial permeability of the core is recorded, stopping the displacement, unloading the confining pressure, and disassembling the holder.

The core is loaded into the holder, 6 g of the above degraded temporary plugging material is plugged at the front end of the core, the confining pressure is set to 5 MPa, the back pressure is set to 2 MPa, the fluid flow rate is adjusted to 1 mL/min, the fluid is displaced to the core, the permeability of the degraded temporary plugging material when plugging the core is recorded, and the permeability recovery rate is calculated. The core is 5 cm long and 2.5 cm in diameter.

$$D = \frac{K_W}{K_0},$$

where D is the permeability recovery rate, %; $K_0$ is the core permeability before plugging, md; and $K_w$ is the core permeability after plugging removal, md.

Figure 4:
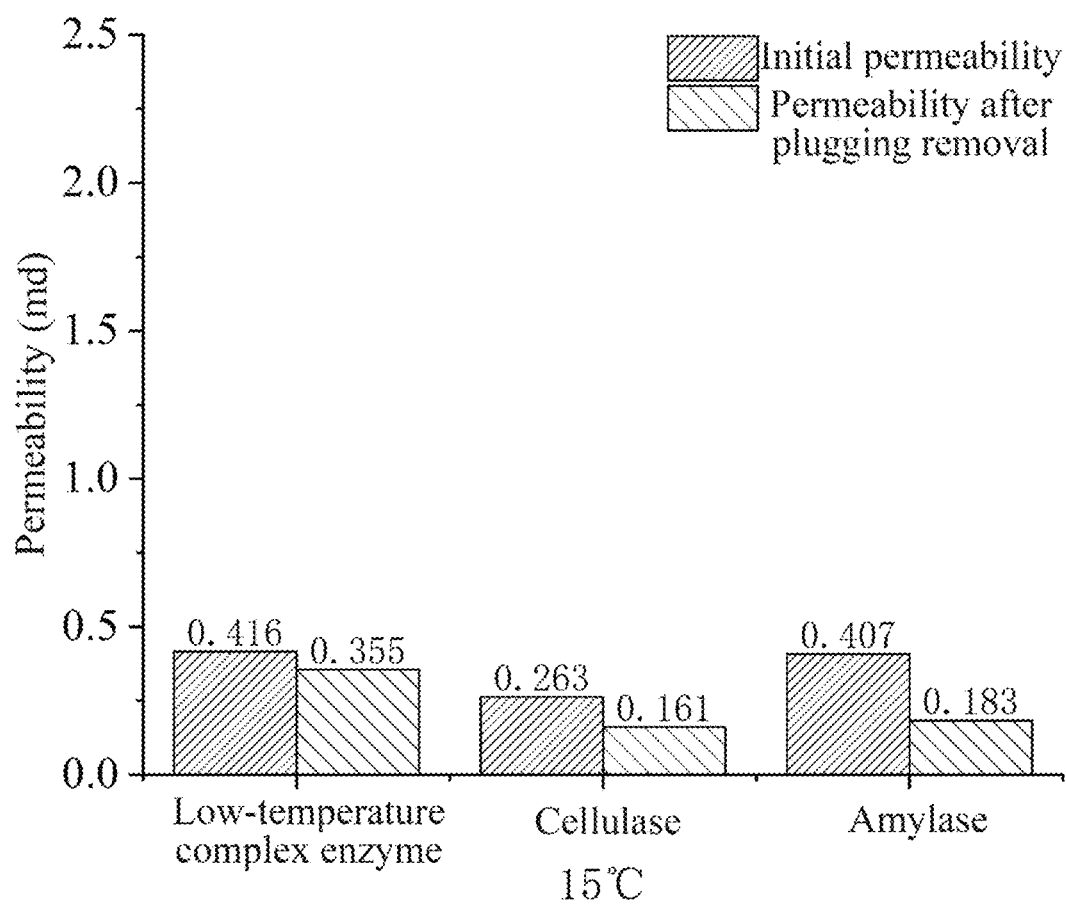
FIG. 4 is a permeability test graph of a bio-enzyme degradable temporary plugging material prepared in Example 1.
Figure 5:
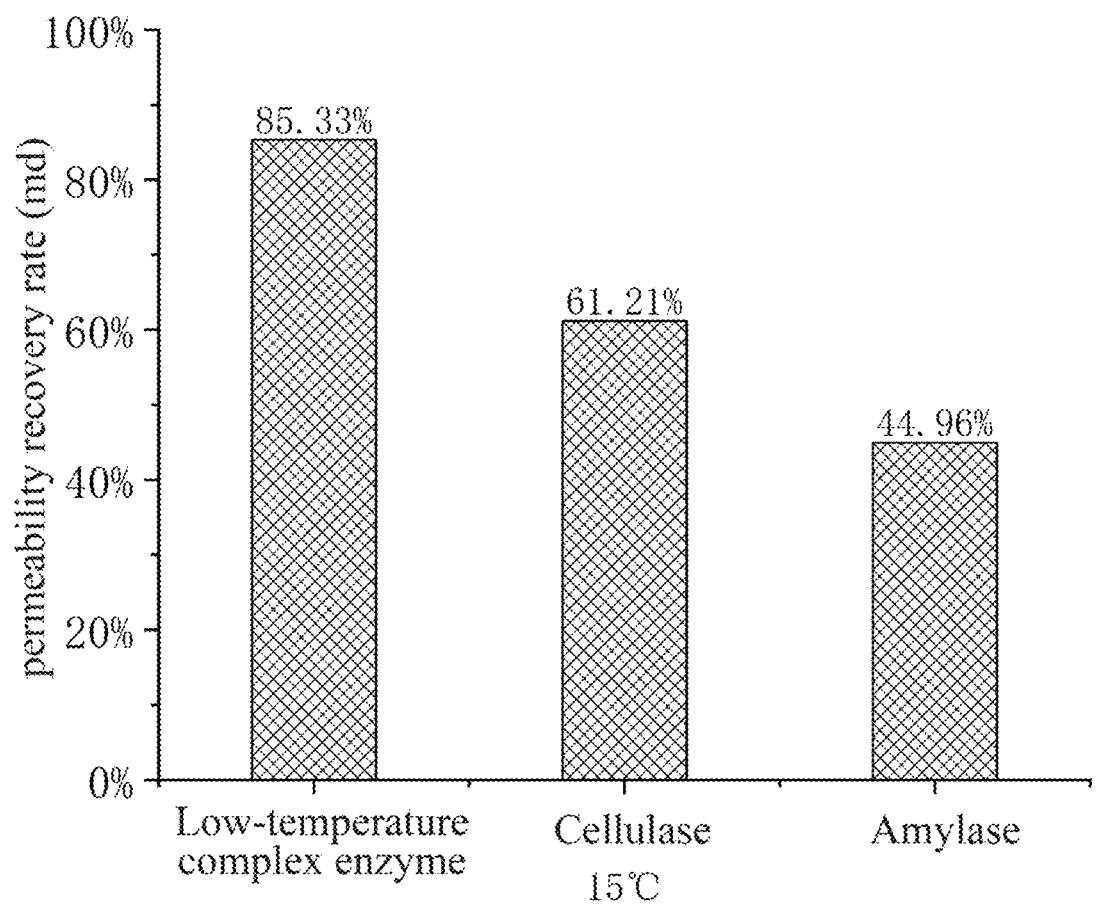
FIG. 5 is a permeability recovery graph of a bio-enzyme degradable temporary plugging material prepared in Example 1.

As shown in FIGS. 4 and 5, after the temporary plugging material is degraded by the bio-enzyme at 15° C., through comparison, for the temporary plugging material degraded by the low-temperature complex enzyme, the change range of permeability before and after plugging the core is small, the permeability recovery rate is the highest, and the degradation performance is the strongest; however, for the temporary plugging materials degraded by cellulase and amylase, the permeability recovery rates in plugging cores decrease, 61.21% and 44.96%. With the decrease in temperature, the activity of the enzyme decreases gradually, and the plugging removal performance becomes worse. In comparison, the low-temperature compound enzyme still has good enzyme activity and strong degradation performance, which is suitable for degrading the temporary plugging materials, to improve the plugging removal effect of the temporary plugging materials.

4. Sand Bed Filtration Test

The temporary plugging materials prepared in Examples 1 to 3 are tested for filtration performance.

Test Method: The penetration depth of drilling fluid is tested by the sand bed filtration test. 300 mL of 60 to 80 mesh quartz sand is added into a cylindrical permeable drilling fluid cup, 150 mL of drilling fluid is poured, the cup cover is tightened, the gas pressure is adjusted to 0.69 MPa, the gas release valve is turned on, and the gas source is introduced for 30 minutes to test the penetration depth of drilling fluid. The drilling fluid is 4% bentonite slurry+3% temporary plugging material.

Figure 6:
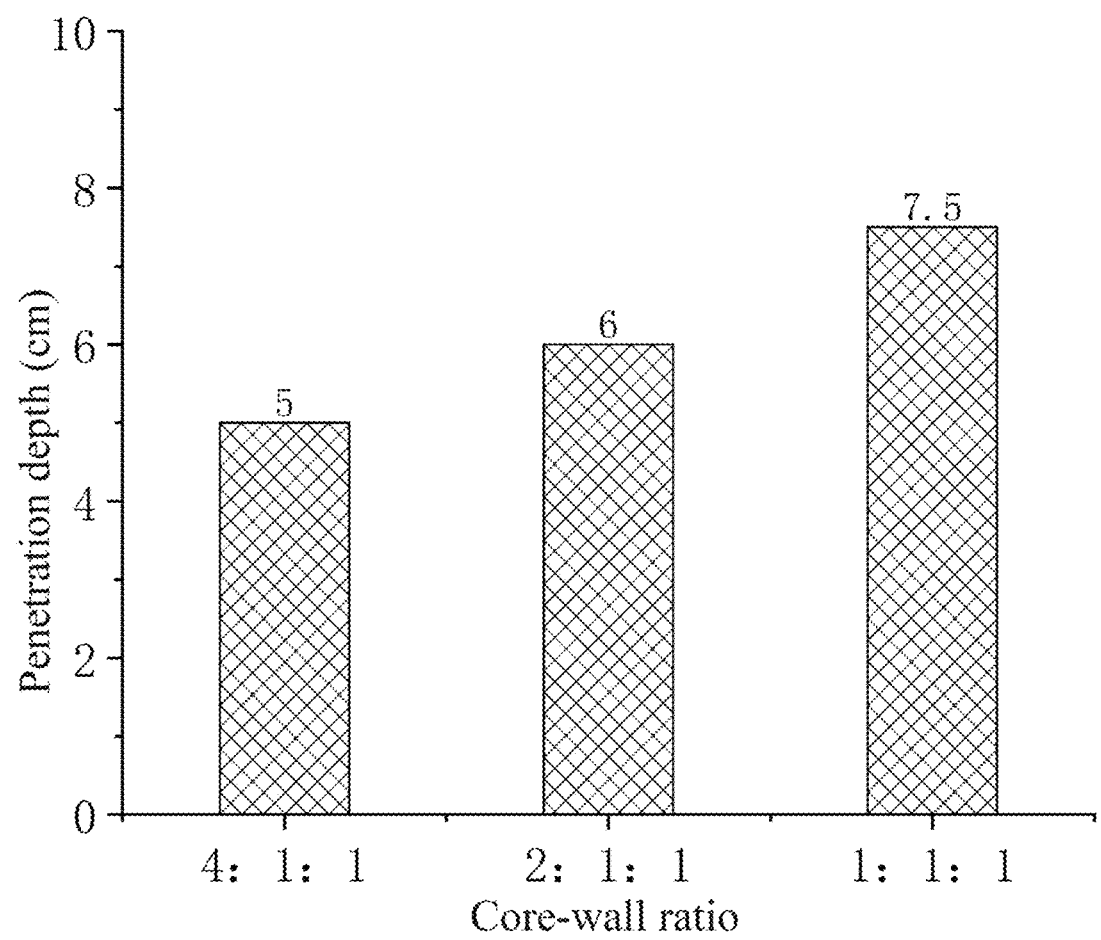
FIG. 6 is a filtration performance test graph of bio-enzyme degradable temporary plugging materials prepared in Examples 1 to 3.

According to the sand bed filtration test, as shown in FIG. 6, when the core-wall ratio is 4:1:1 (temporary plugging material prepared in Example 1), the penetration depth is 5 cm; when the core-wall ratios are 2:1:1 (temporary plugging material prepared in Example 2) and 1:1:1 (temporary plugging material prepared in Example 3), the penetration depths are 6 cm and 7.5 cm, respectively; and when the core-wall ratio is 4:1:1, ethyl cellulose and epoxy resin have a better coating effect on the modified ceramsite, can enhance the plugging performance of the temporary plugging material, and reduce the penetration depth of the drilling fluid.

It can be concluded that the bio-enzyme degradable temporary plugging material of the present disclosure can not only plug the reservoir, but also bio-enzyme plugging removal, which is very suitable for the current exploitation of natural gas hydrate in sea areas, with low costs and a simple preparation method, meeting the environmental requirements of exploitation, and has a good application prospect in the exploitation of natural gas hydrate.

What is claimed is:

1. A process of applying a bio-enzyme degradable temporary plugging material in a well when drilling natural gas in sea areas comprising the following steps:
   (1) preparing a modified ceramsite by:
      mixing ceramsite with an aqueous solution of 3-aminopropyl trimethoxysilane, stirring, and drying to obtain the modified ceramsite;
   (2) preparing a bio-enzyme degradable temporary plugging material by:
      fully dispersing the modified ceramsite, ethyl cellulose, and an epoxy resin in dichloromethane to obtain an oil phase; adding the oil phase into a gelatin aqueous solution and mixing uniformly; stirring, evaporating the dichloromethane, filtering, washing, drying, and obtaining the bio-enzyme degradable temporary plugging material, wherein
      a mass ratio of the modified ceramsite, the ethyl cellulose, and the epoxy resin is (1-4):1:1;
   (3) plugging a reservoir during drilling of the reservoir by applying the bio-enzyme degradable temporary plugging material into the reservoir to maintain stability of well walls; and
   (4) contacting the bio-enzyme degradable temporary plugging material in the reservoir with a bio-enzyme when the drilling is completed to degrade the bio-enzyme degradable temporary plugging material.

2. The process according to claim 1, wherein in the step (1), one or more of the following conditions are met:
   i. a particle size of the ceramsite is 20 to 40 μm;
   ii. a mass ratio of the ceramsite to the 3-aminopropyl trimethoxysilane is (4 to 20):1;
   iii. a mass concentration of the aqueous solution of 3-aminopropyl trimethoxysilane is 0.5% to 10%; and
   iv. a stirring temperature is room temperature, a stirring time is 30 to 50 minutes, and a stirring rate is 200 to 300 r/min.

3. The process according to claim 1, wherein in the step (2), one or more of the following conditions are met:
   i. a mass ratio of the modified ceramsite and the dichloromethane is 1:(4 to 6);
   ii. a mass concentration of the gelatin aqueous solution is 0.5% to 10%; and
   iii. a mass ratio of dichloromethane in the oil phase to water in the gelatin aqueous solution is 1:1.

4. The process according to claim 1, wherein in the step (2), one or more of the following conditions are met:
   i. a stirring temperature is room temperature, a stirring time is 4 to 6 hours, and a stirring rate is 200 to 300 r/min; and
   ii. the organic solvent is evaporated at an evaporation temperature of 45 to 55° C. for 1 to 3 hours under stirring conditions.

5. The process according to claim 1, wherein the bio-enzyme is a low-temperature complex enzyme, cellulase, or amylase.

* * * * *